(12) United States Patent
Yen et al.

(10) Patent No.: US 7,072,948 B2
(45) Date of Patent: *Jul. 4, 2006

(54) INFORMATION RETRIEVAL SYSTEM USING AN INTERNET MULTIPLEXER TO FOCUS USER SELECTION

(75) Inventors: Wei Yen, Cupertino, CA (US); Steven Weinstein, Palo Alto, CA (US)

(73) Assignee: TVWorks, LLC, Philadelphia, PA (US)

( * ) Notice: Subject to any disclaimer, the term of this patent is extended or adjusted under 35 U.S.C. 154(b) by 240 days.

This patent is subject to a terminal disclaimer.

(21) Appl. No.: 10/745,450

(22) Filed: Dec. 22, 2003

(65) Prior Publication Data

US 2004/0133655 A1   Jul. 8, 2004

Related U.S. Application Data

(63) Continuation of application No. 09/401,117, filed on Sep. 21, 1999, now Pat. No. 6,668,278, which is a continuation of application No. 08/770,238, filed on Dec. 20, 1996, now Pat. No. 5,991,799.

(51) Int. Cl.
*G06F 15/16* (2006.01)

(52) U.S. Cl. .................. 709/218; 709/217; 340/500.1; 340/825; 375/219; 379/100.06

(58) Field of Classification Search ................ 709/218, 709/217; 715/769, 788, 500.1; 719/313; 707/10, 5; 345/544; 706/10; 725/109; 340/825; 375/219; 379/100.06

See application file for complete search history.

(56) References Cited

U.S. PATENT DOCUMENTS

| | | | |
|---|---|---|---|
| 4,035,835 A | 7/1977 | Poetsch | 348/228.1 |
| 4,868,557 A | 9/1989 | Perlman | 345/538 |
| 5,005,011 A | 4/1991 | Perlman et al. | 345/540 |
| 5,043,714 A | 8/1991 | Perlman | 345/560 |

(Continued)

FOREIGN PATENT DOCUMENTS

WO   WO 94/14284   6/1994

OTHER PUBLICATIONS

Bussey H E et al: "Service Architecture, Prototype Description, And Network Implications Of A Personalized Information Grazing Service" Multiple Facets of Integration, San Francisco, Jun. 3-7, 1990 Institute of Electrical and Electronic Engineers, pp. 1046-1053 XP000164339 see whole document.

(Continued)

*Primary Examiner*—Thong Vu
*Assistant Examiner*—Hai V. Nguyen
(74) *Attorney, Agent, or Firm*—Patterson & Sheridan, LLP

(57) ABSTRACT

The invention provides a method and system for receiving incoming information from multiple information sources, both interactive and passive, and for engagingly presenting that information to a recipient on a presentation interface. The system includes a "background" element, which interacts with interactive information sources and receives from passive information sources, and determines whether information from those sources is likely to be interesting to the recipient, possibly using one information source to determine priority for another. The system also includes a "foreground" element, which presents information to the recipient when active, but not when inactive. The background is operative even when the foreground element is inactive, and when the background detects new information of interest to the recipient (for example, exceeding a selected threshold of interest or satisfying a selected criterion for interest), it causes the foreground to become active and engage the recipient to select and view that new information. The threshold or criterion may be adaptively responsive to recipient preferences, whether explicitly expressed or implied, but may also be relatively fixed, such as a scheduled time of day.

26 Claims, 2 Drawing Sheets

U.S. PATENT DOCUMENTS

| | | | | |
|---|---|---|---|---|
| 5,065,143 | A | 11/1991 | Greaves et al. | 345/603 |
| 5,065,231 | A | 11/1991 | Greaves et al. | 348/599 |
| 5,097,257 | A | 3/1992 | Clough et al. | 345/213 |
| 5,119,074 | A | 6/1992 | Greaves et al. | 345/603 |
| 5,155,847 | A | 10/1992 | Kirouac et al. | 709/221 |
| 5,367,316 | A | 11/1994 | Ikezaki | 345/158 |
| 5,373,561 | A | 12/1994 | Haber et al. | 713/157 |
| 5,436,673 | A | 7/1995 | Bachmann | 348/645 |
| 5,444,861 | A | 8/1995 | Adamec et al. | 717/178 |
| 5,453,779 | A | 9/1995 | Dan et al. | 725/88 |
| 5,495,610 | A | 2/1996 | Shing et al. | 709/221 |
| 5,497,422 | A | 3/1996 | Tysen et al. | 725/116 |
| 5,530,865 | A * | 6/1996 | Owens et al. | 719/313 |
| 5,541,638 | A | 7/1996 | Story | 725/116 |
| 5,558,339 | A | 9/1996 | Perlman | 463/42 |
| 5,572,643 | A | 11/1996 | Judson | 709/218 |
| 5,586,257 | A | 12/1996 | Perlman | 463/42 |
| 5,600,364 | A | 2/1997 | Hendricks et al. | 725/1 |
| 5,624,316 | A | 4/1997 | Roskowski et al. | 463/45 |
| 5,634,051 | A | 5/1997 | Thomson | 707/5 |
| 5,636,209 | A | 6/1997 | Perlman | 370/281 |
| 5,671,445 | A * | 9/1997 | Gluyas et al. | 710/53 |
| 5,680,458 | A | 10/1997 | Spelman et al. | 380/277 |
| 5,708,845 | A | 1/1998 | Wistendahl et al. | 715/500.1 |
| 5,724,567 | A | 3/1998 | Rose et al. | 707/2 |
| 5,727,129 | A | 3/1998 | Barrett et al. | 706/10 |
| 5,737,599 | A * | 4/1998 | Rowe et al. | 707/10 |
| 5,740,549 | A | 4/1998 | Reilly et al. | 705/14 |
| 5,752,042 | A | 5/1998 | Cole et al. | 717/173 |
| 5,754,178 | A * | 5/1998 | Johnston et al. | 715/769 |
| 5,754,938 | A | 5/1998 | Herz et al. | 725/116 |
| 5,754,939 | A | 5/1998 | Herz et al. | 455/3.04 |
| 5,758,111 | A * | 5/1998 | Shiratori et al. | 715/788 |
| 5,761,306 | A | 6/1998 | Lewis | 380/282 |
| 5,761,662 | A | 6/1998 | Dasan | 707/10 |
| 5,764,992 | A | 6/1998 | Kullick et al. | 717/170 |
| 5,787,172 | A | 7/1998 | Arnold | 713/175 |
| 5,796,840 | A | 8/1998 | Davis | 705/51 |
| 5,808,628 | A | 9/1998 | Hinson | 345/547 |
| 5,809,242 | A | 9/1998 | Shaw et al. | 709/217 |
| 5,809,287 | A | 9/1998 | Stupek, Jr. et al. | 703/22 |
| 5,828,837 | A | 10/1998 | Eikelund | 709/202 |
| 5,850,232 | A | 12/1998 | Engstrom et al. | 345/539 |
| 5,859,969 | A | 1/1999 | Oki et al. | 709/200 |
| 5,867,166 | A | 2/1999 | Myhrvold | 345/539 |
| 5,870,765 | A | 2/1999 | Bauer et al. | 707/203 |
| 5,874,967 | A | 2/1999 | West et al. | 345/629 |
| 5,877,741 | A | 3/1999 | Chee et al. | 345/629 |
| 5,913,040 | A | 6/1999 | Rakavy et al. | 709/232 |
| 5,926,624 | A | 7/1999 | Katz et al. | 709/217 |
| 5,933,811 | A | 8/1999 | Angles et al. | 705/14 |
| 5,936,606 | A | 8/1999 | Lie | 345/629 |
| 5,946,664 | A | 8/1999 | Ebisawa | 705/14 |
| 5,959,623 | A | 9/1999 | Van Hoff et al. | 715/719 |
| 5,977,960 | A | 11/1999 | Nally et al. | 345/563 |
| 5,991,799 | A | 11/1999 | Yen et al. | 709/218 |
| 6,005,574 | A | 12/1999 | Herrod | 715/807 |
| 6,009,363 | A | 12/1999 | Beckert et al. | 701/33 |
| 6,018,768 | A | 1/2000 | Ullman et al. | 709/218 |
| 6,028,583 | A | 2/2000 | Hamburg | 345/629 |
| 6,047,269 | A | 4/2000 | Biffar | 705/39 |
| 6,049,628 | A | 4/2000 | Chen | 382/238 |
| 6,049,835 | A | 4/2000 | Gagnon | 709/245 |
| 6,061,058 | A * | 5/2000 | Owens et al. | 715/769 |
| 6,104,727 | A | 8/2000 | Moura et al. | 370/468 |
| 6,108,014 | A * | 8/2000 | Dye | 345/544 |
| 6,285,985 | B1 | 9/2001 | Horstmann | 705/14 |
| 6,313,854 | B1 * | 11/2001 | Gibson | 715/788 |
| 6,351,745 | B1 | 2/2002 | Itakura et al. | 707/10 |
| 6,668,278 | B1 * | 12/2003 | Yen et al. | 709/218 |

OTHER PUBLICATIONS

Wyle M F: "A Wide Area Network Information Filter" Proceedings International Conference Artificial Intelligence On Wall Street, Oct. 9, 1991, pp. 10-15, XP000534152 see the whole document.

Lang K: "NewsWeeder: learning to filter netnews" Machine Learning. Proceedings Of The Twelfth International Conference On Machine Learning, Tahoe City, CA, USA, Jul. 9-12, 1995, San Francisco, CA, USA, Morgan Kaufmann Publishers, USA, pp. 331-339, XP002046557 see the whole document.

Rosenfeld L B, et al: "Automated Filtering Of Internet Postings" Online, vol. 18, No. 3, May 1994, pp. 27-30, XP000616769 see the whole document.

Yan T W, et al: "Sift—A Tool For Wide-Area Information Dissemination" Usenix Technical Conference, Jan. 16, 1995, pp. 177-186, XP000617276 see the whole document.

* cited by examiner

INFORMATION RETRIEVAL SYSTEM USING AN INTERNET MULTIPLEXER TO FOCUS USER SELECTION

CROSS REFERENCE TO RELATED APPLICATIONS

This application is a continuation of U.S. patent application Ser. No. 09/401,117, filed on Sep. 21, 1999 now U.S. Pat. No. 6,668,278, which application is a continuation of U.S. patent application Ser. No. 08/770,238, filed on Dec. 20, 1996 (now U.S. Pat. No. 5,991,799). Both prior applications are incorporated herein by reference.

BACKGROUND OF THE INVENTION

1. Field of the Invention

The invention relates to techniques for presenting broadcast and other information.

2. Related Art

Multiple sources of information are available for recipients at their homes and offices, including traditional broadcast information sources such as standard broadcast radio and television (available by transmission to a receiver in the home or office), and cable and satellite television (possibly encrypted, scrambled, or otherwise restricted for delivery); traditional switched information sources such as telephone services; and traditional recorded information sources such as audio and video recorded tapes, compact discs and laser discs, and other recorded media.

In addition to these traditional information sources, more recently available information sources include enhanced television services such as "closed caption" (sometimes made available using a television vertical blanking interval or other broadcast or narrowcast data delivery paths), "picture-in-picture" and related techniques for presenting more than one television channel for simultaneous viewing, presentation of textual information using a cable or satellite television system, and videoconferencing; enhanced telephone services such as paging, voicemail or voice messaging, voice response systems, and cellular telephone service; and networking services such as electronic mail, access to the world wide web, and other internet and intranet resources.

Some of these enhanced services have included transmitting information in a variety of formats, including stock quotations and similar financial data in real time, textual information serving to complement a television broadcast (such as subtitles), and information in computer formats (such as HTML code). However, even in circumstances where multiple information sources share a common communication channel (such as the television vertical blanking interval or a radio or television subcarrier), in general each information source has been associated with its own information format, its own selection of which information is to be presented, and its own technique for retrieving and using that information.

One problem which has arisen in the art is that, in combination from all these sources, the amount of information, the variety of forms in which information is delivered and stored, and the variety of techniques for receiving and selecting information, can overload the capability of the ordinary recipient to manage and record. The amount and variety of information sources and delivered information can outstrip the capability of the ordinary recipient to organize that information, to select among and assign priorities to that information for review, and to record and respond to that information.

It would be advantageous to provide a single point of contact that an ordinary recipient (one without advanced technical training) could use to receive information from a variety of information sources, whether traditional, enhanced, or more recent, and a single technique or interface which an ordinary recipient could use for selecting among and assigning priorities to information for review, reviewing information, and recording and responding to that information.

Known methods for delivering information to recipients include interactive presentation of textual information to a user (much like using a television picture tube as a computer monitor), in which the user receives textual information from a cable or satellite central location and transmits commands or selections back to that central location. For example, some hotel in-house cable systems enable users to review the hotel's event schedules, movie schedules, or billing information. Some hotel in-house cable systems enable users to determine whether there are voicemail messages waiting for them (but they must often use the hotel in-house telephone system to retrieve those messages). Some cable and satellite television broadcast systems, and some video cassette recorders, provide on-screen displays of television program schedules.

However, these interactive methods of using television transmission technology merely substitute for known methods of presenting text and other information on a computer monitor, and do not serve to significantly improve the capability of the user to manage and record information from a variety of information sources. Rather, interactive use of television transmission technology simply provides yet another heterogeneous information source, with yet another interface technique.

Known methods for delivering information to recipients also include periodic presentation of information to a user, in response to selections by the user from a menu of items of likely interest. For example, known services on the internet select information from delayed stock quotation sources or newswire sources, and present that information to the user, either periodically in a separate window or on a computer monitor. The "PointCast" service also presents information, like a "screen saver", in response to inactivity by the user. In some cases, the information presented may include links to further information, which the user may select to review that further information.

However, these methods of passively filtering information available on a network merely substitute for known methods of searching databases and other information, and do not serve to significantly improve the capability of the user to manage and record information from a variety of information sources. Rather, passively filtering information available on a network simply provides yet another heterogeneous information source, with yet another interface technique. Moreover, being responsive to inactivity by the recipient is a drawback for broadcast media, for which inactivity by the recipient is a common mode of behavior.

In addition to providing a single point of contact for receiving information from a variety of information sources, it would also be advantageous to provide a substantial degree of automated knowledge at the point of contact, so that a device at the point of contact could perform tasks related to selection, assignment of priorities, and organization of incoming information on behalf of the recipient and in response to the recipient's preferences.

Accordingly, it would be desirable to provide a method and system for receiving information from a variety of sources, both interactive and passive, and for engagingly presenting that information to a recipient. This advantage is achieved in an embodiment of the invention in which a background element operates to interact with, combine, filter and prioritize multiple information sources, possibly using one information source to prioritize another. This advantage is also achieved in an embodiment of the invention in which a foreground element presents information to the recipient (when it is active, but not when it is inactive), and the background operates (even when the foreground is inactive), to trigger the foreground to engage the recipient to select and view that new information.

SUMMARY OF THE INVENTION

The invention provides a method and system for receiving incoming information from multiple information sources, both interactive and passive, and for engagingly presenting that information to a recipient on a presentation interface.

The system includes a "background" element, which interacts with interactive information sources and receives from passive information sources, and determines whether information from those sources is likely to be interesting to the recipient, possibly using one information source to determine priority for another. The system also includes a "foreground" element, which presents information to the recipient when active, but not when inactive. The background is operative even when the foreground element is inactive, and when the background detects new information of interest to the recipient (for example, exceeding a selected threshold of interest or satisfying a selected criterion for interest), it causes the foreground to become active and engage the recipient to select and view that new information. In preferred embodiments, the threshold or criterion may be adaptively responsive to recipient preferences, whether explicitly expressed or implied, but may also be relatively fixed, such as a scheduled time of day.

When active, the foreground focuses on each information source in a selected order, preferably a sequential order prioritized by the recipient preferences, and tracking across a presentation screen along a linear track (such as a horizontal, vertical, or circular sweep of the presentation interface). The foreground allows the recipient to select an information source when the focus arrives at an identifier for that information source, or to move the focus backward or forward to an identifier for a desired information source and then to select that desired information source.

The background examines information both from interactive sources, for which the system acquires information by specific requests (such as database searches, web pages, and other command-directed sources), and from passive sources, for which the system acquires information by turning its attention to the source (such as broadcast or narrowcast signals, electronic mail, news feeds, and other information already targeted at the recipient). The background filters and preferably prioritizes the information sources in response to the recipient preferences (whether explicitly stated by the recipient or deduced in response to the recipient's viewing habits or other information about the recipient), in response to crosslinks between information sources, in response to triggering events (such as time of day, arrival of a new information source or a change in an old information source), in response to demographic information about a recipient, in response to other related information about a recipient, in response to viewing responses by other recipients (such as those persons known to the recipient or in the recipient's demographic group), and in response to statistical measures thereof.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

System Components

Figure 1:
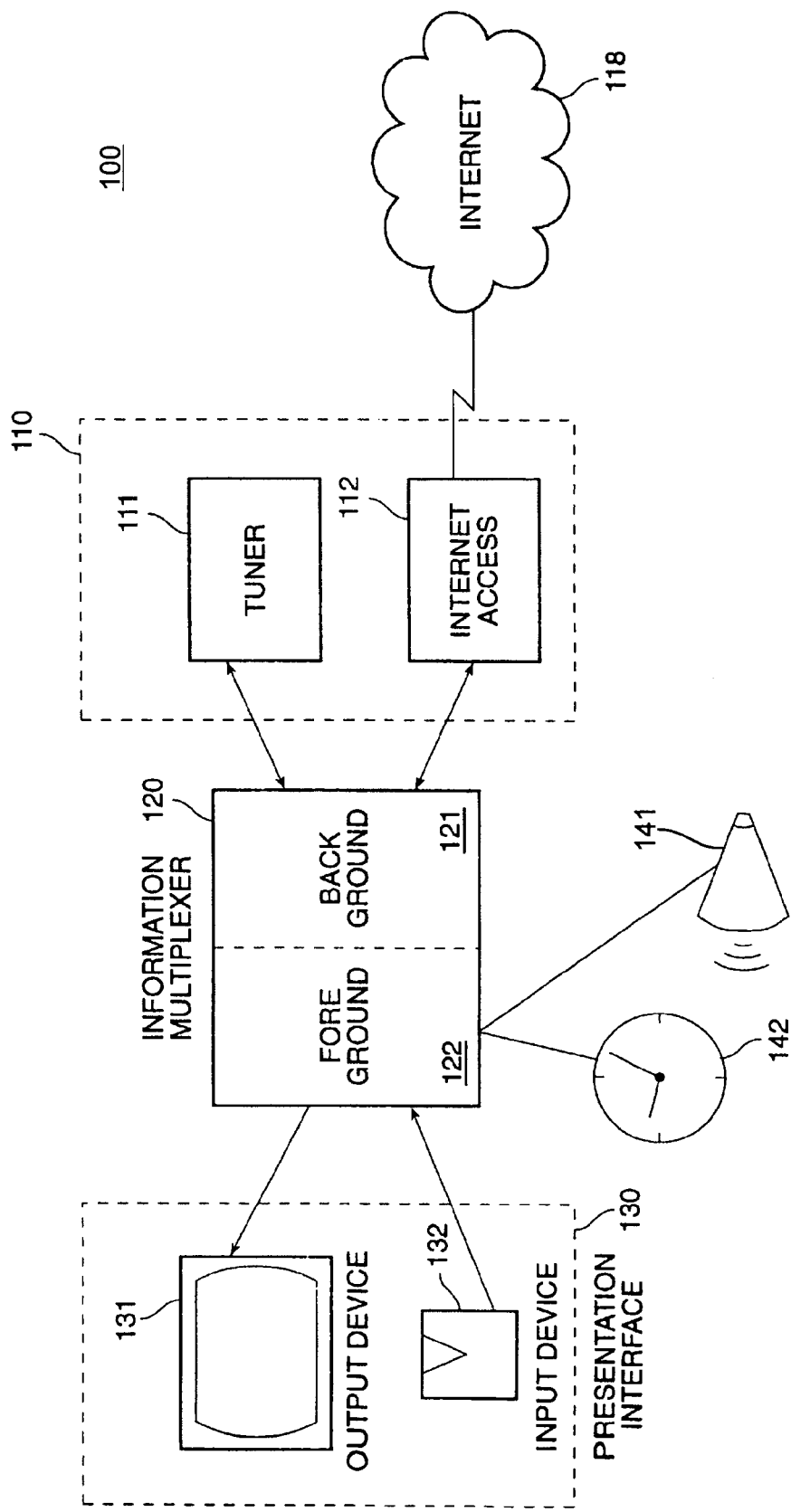
FIG. 1 shows a block diagram of the system for receiving information and engagingly presenting that information to a recipient.

FIG. 1 shows a block diagram of the system 100 for receiving information and engagingly presenting that information to a recipient.

A system 100 comprises a plurality of information receivers 110, including at least one passive tuner 111 and at least one internet access point 112; an information multiplexer 120, including a processor, program and data memory, and mass storage; a presentation interface 130, including an output device 131 such as a television monitor and speakers, an input device 132 such as a television remote control, and a plurality of sensors such as a motion sensor 141 and a timer 142.

In alternative embodiments, the system 100 may comprise fewer than all these elements and still be effectively operational, such as omitting mass storage elements, omitting the motion sensor 141 or the timer 142, or having a reduced presentation interface 130. A reduced presentation interface 130 may comprise only a television monitor without speakers, only speakers without a television monitor, a moving character display using a plurality of individual lighted elements such as used in motion picture billboards and other applications, or other devices for presenting information to recipients.

The tuner 111 comprises a television signal tuner disposed for receiving broadcast television, cable television, or direct-broadcast satellite television. In alternative embodiments, the tuner 111 may comprise another type of passive information receiver for other types of signals such as those transmitted on radio frequencies, television closed-caption, or television or radio subcarrier signals. The tuner 111 is capable of being tuned to receive information signals, such as signals in a television broadcast format, on one of a plurality of channels. In a preferred embodiment, a primary use of the tuner 111 is to receive television signals in a broadcast television format from a television antenna or from a videocassette recorder-player.

The tuner 111 is coupled to the information multiplexer 120, is disposed for receiving a control signal from the information multiplexer 120 for selecting a target channel for tuning, and is disposed for providing a tuned broadcast signal to the information multiplexer 120.

In a preferred embodiment, the tuned broadcast signal comprises further information in addition to broadcast television shows, such as annotation for those television shows or other broadcast information as described herein. This further information can be incorporated into the vertical blanking interval (VBI) in broadcast television signals, or can be incorporated into known data transmission channels in stored television signal formats such as the "MPEG II" standard. Both use of the VBI and MPEG II are known in the art of television.

The internet access point 112 comprises a communication link to a network 118 such as an internet or intranet, such as a communication link to an internet router using a telephone line modem, an ISDN or T-1 line, a LAN connection, or another type of connection. The communication link to the network 118 can broadly encompass any technique for communication, including for example transmitting commands using a first communication path and receiving data using a second communication path, even when the second communication path is substantially unidirectional (such as a radio signal, a signal transmitted using the vertical blanking interval or other television subcarrier signal, a cable television signal, a direct-broadcast signal, or other broadcast signal used for a data return path).

The internet access point 112 is capable of transmitting and receiving according to one or more communication protocols, including for example an internet telephone protocol, a telnet protocol, file-transfer protocol (FTP), hypertext transfer protocol (HTTP), or other protocol for sending requests and receiving information responsive to those requests.

The internet access point 112 can comprise a communication link to a server device (not shown), which provides the capability of transmitting and receiving according to at least some of the communication protocols as a proxy for the internet access point 112 itself. In a preferred embodiment incorporating such a server device, the server device is coupled to the network 118 and is available to the internet access point 112 using the network 118. However, in alternative embodiments, the server device may be coupled to the internet access point 112 using a direct communication link, using a local area network, or using another type of network such as an intranet or a proprietary network.

In a preferred embodiment, primary uses of the internet access point 112 are to request and receive web pages and other information from web servers coupled to the network 118, to request and receive newswire information and updates from news sources coupled to the network 118, to request and receive television program guides from sources coupled to the network 118, to send and receive electronic mail using the network 118, and to place and receive telephone calls using an internet phone protocol using the network 118.

The internet access point 112 is coupled to the information multiplexer 120 and is disposed for receiving a network request from the information multiplexer 120; the network request can include a request for newswire information, an FTP request, an HTTP request, a request for a television program guide, an request to place an internet telephone call, a request to send electronic mail, or another network protocol request.

The internet access point 112 is also disposed for providing responses to requests to the information multiplexer 120; the responses can include a stream of updated newswire information, a retrieved data file, a hypertext page (such as a web page or information therefrom), a television program guide, received electronic mail, an internet telephone connection, or another network protocol response.

The information multiplexer 120 comprises a background element 121 and a foreground element 122.

The background element 121 controls the information receivers 110 so as to receive and identify information that is likely to be interesting to the recipient, to alert the foreground element 122 that such information is available, and to couple items of information, and identifiers for those items, to the foreground element 122 for selection by and presentation to the recipient. The background element 121 is continuously operational to control the information receivers 110, and to receive and process information therefrom.

Activity by the background element 121 in identifying information which is likely to be interesting to the recipient is described in further detail in the section headed "Preferences and Alerting".

The foreground element 122 is coupled to the presentation interface 130 and controls the presentation interface 130 so as to present identifiers for information to be selected by the recipient, to receive selections from the recipient, and so as to present information to the recipient in response to those selections.

Activity by the foreground element 122 and use of the output device 131 and the input device 132 in presenting identifiers, making selections by the recipient, and presenting information, is described in further detail in the section headed "Linear Sequential Focus".

The output device 131 comprises a television monitor and a speaker. The television monitor preferably has a large screen and high resolution so as to promote viewing of at least one primary image and a plurality of secondary images.

The output device 131 is coupled to the information multiplexer 120 so as to provide, to the recipient, selectable identifiers for information items, selected information items, and parameters for operation of the information multiplexer 120.

Particular information to be presented can include any of the following:

Information from broadcast services, such as broadcast radio or television.

Information from internet services, such as electronic mail or web pages.

Parameters for operation of the background element 121 or the foreground element 122.

Selectable identifiers for information which the recipient may wish to view.

The input device 132 comprises a hand-held control console, such as a television remote control device, coupled to provide inputs to the information multiplexer 120 using an infrared communication link or similar communication link, so that the recipient can operate the input device 132 at a distance which is convenient for viewing broadcast television on the output device 131.

The input device 132 is coupled to the information multiplexer 120 so as to provide, from the recipient, selections of particular information to be presented by the foreground element 122 to the recipient, and commands directing the information multiplexer 120 to perform particular actions. Particular actions can include any of the following:

1. Powering the presentation interface 130 on and off;

2. Selecting or deselecting a broadcast television channel or directing the presentation interface to display or not display broadcast television;

3. Selecting or deselecting a particular information element, such as a broadcast television show or videocassette movie;

4. Selecting or deselecting a particular internet service.

5. Selecting or deselecting parameters for operation of the background element 121, such as preferences for "interesting" information items, or an interest threshold; and 6. Selecting or deselecting parameters for operation of the foreground element 122, such as a speed for sequential focus changes, or moving the focus backward or forward.

The sensors 141, 142 provide inputs to the system 100 which aid the system 100 in tailoring its operation to particular recipients. For example, the motion sensor 141 provides information relating to whether the recipient is present (and possibly the number of recipients present). The timer 142 provides information relating to the date and time.

In alternative embodiments, the input device 132 can be used to provide inputs to the system 100 regarding which particular recipient or recipients are viewing the output device 132. For example, where applicable the system 100 can encourage or require recipients to "log in" so as to indicate their identities. This procedure can be in addition to or instead of use of the sensors 141, 142 to determine the number or type of recipients.

Combining Multiple Information Sources

As used herein, information is received as a stream of items, each of which comprises data in one of a plurality of format types, such as text, hypertext, still photographs, audio, video, synchronized audiovisual material, or other format types. In a preferred embodiment, each item comprises both an indicator of its content, and a body comprising the actual data for presentation to the recipient. Certain information items can themselves comprise indices or other indicators of content, such as an electronic program guide. For example, the indicators of content or the electronic program guide can indicate which broadcast shows are available at which times and on which channels, as well as other information about information items (including both shows and other data) which are expected to be available, both in the broadcast stream and using the internet access point 112.

For example, the tag or electronic program guide can indicate the following types of information about broadcast shows and similar information items:

Subject matter for information items, such as whether those information items comprise news, weather, sports, politics, electronic mail, or opinion. The subject matter can include other particulars regarding the content of the information item, such as which persons are featured as actors, guests, or subjects of a broadcast show or other information item; which products are advertised or otherwise featured on a broadcast show or other information item; or which companies are producers or sponsors of a broadcast show or other information item.

In the case of an information item relating to direct communication, such as a telephone call or electronic mail message, the subject matter can comprise the originator of the call or message, "automatic number identification" types of information, such as the originating telephone number or e-mail address, locality from where the call or message originated, and whether or not the call was placed using a form of directory assistance.

A locality value for information items, such as the cities or states most relevant to the item. The locality value can also comprise information about which demographic groups the information item would most appeal to, such as groups with particular ethnicity, national origin, religion, or political affiliation.

An urgency value, for information items, such as to indicate urgent e-mail or a hot news story. The urgency value can be directed to particular demographic groups, so as to distinguish between information items which are of broad general urgency and those which are of urgency only to specialized groups (such as items which are urgent only for adults, or which are urgent for everyone but might be disturbing for children).

A content-rating value, for information items, such as a rating value as used for motion pictures. For example, the content-rating value can include a rating for sex, violence, adult language, or banality.

In the case of "real time" information items, such as broadcast news, sports, or stock market information, the tag or other annotation can be omitted, or can be supplemented using real-time voice recognition techniques to provide searchable text.

It will be clear to those skilled in the art that, for broadcast items, tags or other annotation information can be supplied when the information item is created, can be supplied when the information item is merged into a stream of information items to be broadcast, can be supplied as the information item is about to be broadcast, or can be deduced in real time by the background element 121. Similarly, it will be clear to those skilled in the art that, for non-broadcast items, tags or other annotation information can be supplied when the information item is created, can be supplied when the information item is searched for or bookmarked, can be supplied as the information is about to be transferred to the background element 121, or can be deduced in real time by the background element 121.

It will be clear to those skilled in the art that the sources of information items broadly encompass a wide variety of different types of sources and different modalities for receiving information from those sources, whether passively or actively.

In addition to traditional broadcast sources such as television and radio shows, other passive information sources can include any of the following:

1. Stored media such as audio CDs, OD-ROMs, laser disks, video cassettes, and photo disks;

2. Closed-caption and other subcarrier information embedded into television or radio broadcasts (such as embedded into the television signal vertical blanking interval), or embedded into stored media such as in MPEG audio/video and GIF/JPEG still image formats;

3. Narrowcast and direct-broadcast information (such as news wires, sports information, and stock tickers); and 4. Incoming telephone calls or related communication links, whether voice, data, or facsimile information.

In addition to traditional telephone connectivity to the internet, other active information sources can include any of the following:

1. Interactive telephone access to other information sources, including time-sharing computer systems, computer bulletin board systems, and switched communication networks (including DTMF response systems and voice-activated systems responsive to generated voice);

2. Other communication links for interactive connectivity to the internet, including split communication techniques using part-broadcast and part-telephone connectivity;

3. Interactive connectivity to other computer networks or systems, including software agents and proxies for searching for and retrieving information; and 4. Access to remote databases or searchable data, including systems responsive to generated data retrieval and search commands.

Each information item from passive information sources and active information sources can be crosslinked so the information multiplexer 120 is able to reference other information items, whether from the same source or another source. This crosslinking allows the information multiplexer 120 to present a diverse set of information items in a seamless integrated form, so as to present each information item to the recipient in context with all other information items which are related.

For example, a broadcast show such as a television football game (such as from a broadcast television station) can be crosslinked with a database of all football teams in the same league and their current competitive standing (such as at a web page), with a real-time news feed of other football games and scores (such as from a direct-broadcast radio signal), with audio/video tapes of interviews with players currently on field (such as from a video cassette tape), with still photos of the stadium (such as from another web page), and with a travel agency service specializing in that city (such as from an electronic airline guide, a voice response system, or electronic mail to a travel agency), in response to crosslinks, content tags, or other annotation information.

The background element 121 can determine the degree of relatedness between two information items, in response to the nature and number of crosslinks between those items. In response thereto, the background element 121 can determine the likely degree of interest the recipient will have in each information item, and so determine whether to transmit those information items to the foreground element 122. The foreground element 122 can determine which information items can or should be displayed to the recipient, whether sequentially, simultaneously, or in response to selections made by the recipient when those information items are engagingly presented to the recipient. Similarly, the background element 121 and the foreground element 122 can determine whether or not to halt, interrupt, reorganize, or supplement presentation of a first information item with a second information item, in response to a variety of factors, including the nature of those information items (such as whether they include audio, video, text, or other display form factors), the recipient's preferences and alert threshold (including those expressed explicitly and those deduced from the recipient's viewing habits), and the interestingness of the information items (determined as noted in the section "Preferences and Alerting" and otherwise herein).

Preferences and Alerting

In a memory, the background element 121 of the information multiplexer 120 records a set of preferences for the recipient, indicating the types of information the recipient is likely to be interested in. In a preferred embodiment, the preferences assign a weighted value in response to the presence or absence of each tag, or in response to discernable content of the item, such as the textual content of the item.

For example, the preferences can indicate that the recipient is very interested in sports reports for San Francisco teams, but only slightly interested in sports reports for other teams.

In a preferred embodiment, the background element 121 examines information items from a variety of sources, including both interactive sources and passive sources. Interactive sources involve internet services; the background element 121 causes the internet access point 112 to make specific requests for the information, using one or more internet protocols. For example, the background element 121 can cause the internet access point 112 to issue requests for information from web pages using the HTTP protocol. Passive sources involve broadcast services; the background element 121 causes the tuner 111 to tune to particular channels and receive broadcast signals on those channels. For example, the background element 121 can cause the tuner 111 to tune to broadcast television shows for presenting those shows to the recipient.

In a preferred embodiment, the recipient's preferences are responsive to at least one of the following: (1) being set directly by the recipient; (2) being set in response to earlier selections made by the recipient; (3) being set in response to selections made by persons other than the recipient; (4) being set in response to an exogenous triggering event or other exogenous information; (5) being set in response to demographic information about the recipient; and (6) being set in response to product information about the system 100 itself.

1. Being set directly by the recipient. The recipient can specify classes of information items which are deemed interesting, or can specify particular information items (such as bookmarks to particular web sites, subscriptions to periodic messages, or subscriptions to particular periodic broadcast shows).

2. Being set in response to earlier selections made by the recipient (such as the viewing habits of the recipient). The information multiplexer 120 can determine that if the recipient selects and views an item, that the item is one of the recipient's preferences.

The information multiplexer 120 can subject the earlier selections made by the recipient to statistical or other tests to determine if those selections truly represent the recipient's preferences. For example, the information multiplexer 120 can determine whether the recipient is statistically much more likely to select information items having specified parameters, if the recipient has selected such information items repeatedly in a short time period, or if the recipient has either selected such information items and immediately deselected them or has selected such information items and viewed them for an extended time period.

3. Being set in response to selections made by persons other than the recipient (such as other recipients known to the recipient or in the recipient's demographic group). The information multiplexer 120 can determine that if persons known to the recipient (such as the recipient's family, friends, or co-workers) select and view an item, or if persons in the recipient's demographic group select and view an item, that the item may be one of the recipient's preferences.

The information multiplexer 120 can also determine that other related information items would also be interesting to the recipient in response to common viewing actions by the recipient and other persons. For example, during or after the recipient has viewed an information item, the information multiplexer 120 could suggest contacting those other persons by electronic mail or telephone.

4. Being set in response to an exogenous triggering event or other exogenous information. The triggering event can include, for example, a day of the week, a time of day, the start of new broadcast show, or the appearance of a new web site or similar information item. The other exogenous information can include, for example, which channel is currently selected for the tuner 111, annotation information about a broadcast show currently being viewed, which site or domain is selected for the internet access point 112.

5. Being set in response to demographic information about the recipient (such as age, sex, income level, zip code, profession, or marital status), or the recipient's affiliations, employer, hometown, investments, relatives, vacation plans, or other information particular to the recipient (such as a recorded history of purchase transactions, sites visited, or other persons telephoned).

6. Being set in response to product information about the system 100 itself (such as its present location, its time since manufacture, where it was purchased, whether the system 100 is mobile, and whether the system 100 is installed in a vehicle).

In response to each item, the background element 121 determines whether that item is sufficiently interesting to present to the recipient. The background element 121 may respond to the content of the item, to a header or tag associated with the item, to a crosslink to another item which is determined to be interesting, or to an urgency or unusualness of the item itself (such as for example an item regarding a natural disaster occurring near the recipient).

Crosslinks to related items can include a wide variety of secondary information sources, such as a hypertext link to a web site being displayed in a picture from a broadcast show, a hypertext link to a web site being displayed in closed-caption text or other annotation information (for example, a commercial for a Ford pickup truck can include hypertext links to Ford's web site and to web sites for pickup truck comparisons), or another type of directive to the system 100 to obtain secondary information (such as a telephone number to call which can be selected by the recipient to invoke an autodialer, or a commercial for a product which includes a directive to perform a search for local retailers for that product).

It may occur that there are more interesting items being made available for presentation to the recipient, that the recipient is at that time viewing a different item, or that the recipient has put the presentation interface 130 into an inactive mode.

When the background element 121 determines that the item is sufficiently interesting to present to the recipient, the background element 121 transmits that item to the foreground element 122.

When the background element 121 transmits the information item to the foreground element 122, the foreground element 122 may take one of several actions, in response to the recipient's preferences: (a) the foreground element 122 can immediately begin displaying the information item; (b) the foreground element 122 can request confirmation from the recipient, and if confirmed, immediately begin displaying the information item; (c) the foreground element 122 can add the information item to a set of information items from which the foreground element 122 engages the recipient to select; (d) the foreground element 122 can request confirmation from the recipient, and if confirmed, add the information item to the set of information items from which the foreground element 122 engages the recipient to select; or (e) the foreground element 122 can take some other action to bring the information item to the attention of the recipient.

In a preferred embodiment, the background element 121 records an alert threshold, indicating a degree of interest which is required for the background element 121 to alert the foreground element 122. The background element 121 compares the weighted value against the threshold, and if the weighted value exceeds the threshold, the background element 121 alerts the foreground element 122 to interrupt any ongoing presentation, or to enter an active mode for presentation, so as to bring the item to the attention of the recipient. To do so, the foreground element 122 presents an indicator for the item, or for sufficiently high interest values, immediately presents the item itself, to the recipient.

In alternative embodiments, the background element 121 may record a set of alert criteria, indicating those types of information items which the recipient wishes to be alerted to.

In a preferred embodiment, the alert threshold (or the alert criteria) is responsive to at least one of the following: (1) being set directly by the recipient; (2) being set in response to preference factors; (3) being set in response to exogenous factors; and (4) being set adaptively in response to actions by the recipient.

1. Being set directly by the recipient. The recipient can specify separate threshold responsive to preference factors and exogenous factors described just below. Where the recipient has specified interest in particular classes or particular periodic information items, the recipient can specify an alert threshold for interrupting those items.

2. Being set in response to preference factors. These preference factors can include an interest value for an ongoing presentation (such as a television show or movie being viewed by the recipient), a priority tag for the alerted item (such as an emergency weather report), or an "interruptability" value for the ongoing presentation (such as a difference between interrupting viewing electronic mail as opposed to interrupting a television show or movie, or a difference between interrupting a television show or movie as opposed to interrupting a commercial).

3. Being set in resnonse to exogenous factors, including a day of the week, a time of day, or a number of recipients present for viewing the alerted item, or a particular information item currently being viewed by the recipient.

4. Being set adaptively in response to actions by the recipient, such as whether the recipient often selects items with interest values less than the recorded threshold or often fails to select items with interest values greater than the recorded threshold.

In a preferred embodiment, the background element 121 also alerts the foreground element 122 to present items in response to selected timed preferences. For example, the recipient can select a particular television show for presentation at a particular day of the week and time of day, or the background element 121 can adaptively determine from a history of the recipient's selections that the recipient will have a high interest in viewing that particular television show for presentation at that particular day of the week and time of day.

State Diagram

Figure 2:
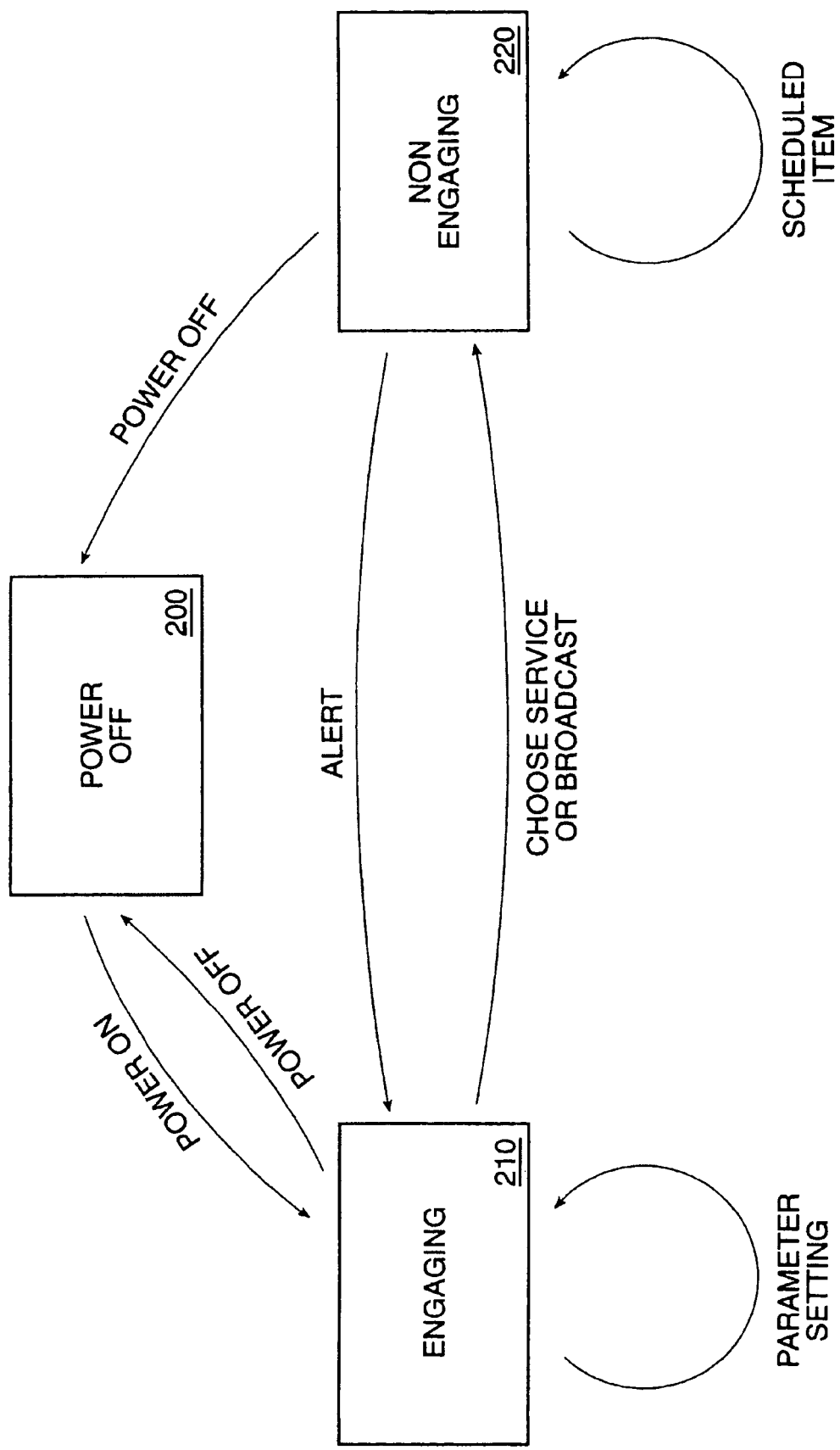
FIG. 2 shows a state diagram of the system.

FIG. 2 shows a state diagram of the system 100 of FIG. 1.

The foreground element 122 has an active mode that prompts the output device 131 to present images and sound to the recipient and an inactive mode that maintains the output device 131 dark and silent, so as not to present any information to the recipient. While the foreground element 122 is in either its active mode or its inactive mode, the background element 121 continues to operate and to possibly generate alerts for the foreground element 122.

The system 100 presents itself to the recipient as being in a power-off state 200, an engaging state 210, or nonengaging state 220.

In the power-off state 200, the information multiplexer 120 does not operate the presentation interface 130 and does not display any information to the recipient.

The information multiplexer 120 transitions to the power-off state 200 from any other state in response to a power-off command from the input device 132.

In the engaging state 210, the foreground element 122 of the information multiplexer 120 operates to engage the recipient to select information items for presentation. The foreground element 122 presents for selection those information items which the background element 121 has determined are likely to be of interest to the recipient.

These information items can include any of the following:
electronic mail messages, important news items, sports scores, stock prices, and weather reports;

1. selectable broadcast information channels, prerecorded media or direct audiovisual input (such as videocassette tapes), selectable cable or satellite information channels;

2. selections of internet services (such as electronic mail, internet telephone, worldwide web, or other internet services); or 3. selectable preferences for the background element 121 or the foreground element 122.

The information multiplexer 120 transitions from the power-off state 200 to the engaging state 210 in response to a power-on command from the input device 132. While in the engaging state 210, the information multiplexer 120 also accepts parameters for operation of the background element 121 and parameters for operation of the foreground element 122, after which it remains in the engaging state 210.

In the nonengaging state 220, the foreground element 122 of the information multiplexer 120 operates to allow the recipient to use a particular internet service or view a particular broadcast presentation, without attempting to engage the recipient to select information items for presentation.

The information multiplexer 120 transitions from the engaging state 210 to the nonengaging state 220 in response to the recipient choosing to use particular internet service or to view a particular broadcast presentation, using the input device 132.

The information multiplexer 120 transitions from the nonengaging state 220 to the engaging state 210 in response to an alert from the background element 121 to the foreground element 122, indicating that a new information item, sufficiently interesting to meet the alert threshold or the alert criteria, has arrived. The foreground element 122 adds the new information item to its list of selectable information items and attempts to engage the recipient to select that new item or some other information item.

One particular class of new information items are those items which have been scheduled for a predetermined time, such as a broadcast television show which is known to arrive on a particular channel and at a particular time (or important news items which are known to arrive at particular times, such as sports results or stock prices). The recipient can set the alert threshold or the alert criteria so that the scheduled program causes the foreground element 122 of the information multiplexer 120 to transition from the engaging state 210 to the nonengaging state 220, or to remain in the nonengaging state 220, and to present the scheduled information item immediately.

The recipient can also set an preference for operation of the information multiplexer 120 in which the new information items which meet the alert threshold or the alert criteria do not cause the information multiplexer 120 to transition out of the nonengaging state 220, but instead to display one or more selectable information items at an unobtrusive location on the screen of the output device 131, such as in a caption line at a bottom region of the screen of the output device 131.

Linear Sequential Focus

In the engaging state 210, the foreground element 122 of the information multiplexer 120 presents identifiers for information items for selection by the recipient. The foreground element 122 associates a "focus" with each identifier in turn. The identifier having the focus is presented so as to draw more attention to that identifier; for example, the identifier having the focus can be relatively brighter or larger than other identifier; can be emphasized using a pointer or text; can be boldfaced, italicized, underlined, presented in reverse-video, or enclosed in a box or other graphic; or can be given some other form of emphasis.

The foreground element 122 associates the focus with each identifier in a sequential order. The sequential order is preferably ordered in response to the recipient's preferences, but may alternatively be alphabetized, ordered by arrival time, or placed in some other order.

The sequential order tracks across the presentation screen for the output device 131 in a linear direction. In a preferred embodiment, the linear direction is a horizontal sweep of the screen, giving each identifier the focus in response to its presented distance from the left edge of the screen. Thus, a first identifier which is at the left edge of the screen would have be earlier in the sequential order than a second identifier which was to its right, regardless of the relative vertical positions of the two identifiers. However, in alternative embodiments, the linear direction may be a vertical sweep of the screen from top to bottom (or from bottom to top), or a circular sweep of the screen in a clockwise direction (or in a counterclockwise direction).

The input device 132 has controls disposed thereon so that the recipient can select an information item in response to its identifier when that identifier has the focus, or can cause the focus to move backwards or forwards in the sequential order so as to bring the focus to a particular identifier and then to select that identifier.

The foreground element 122 repeats the sequential order when it is complete, so that each identifier is given the focus in turn in a substantially round-robin manner.

When an information item is selected, it is presented to the recipient for viewing, and is given seizure of the speaker for the output device 131. Other identifiers are relegated to display on a relatively small, if any, share of the screen.

In a preferred embodiment, the other identifiers comprise only relatively smaller graphics or text near the bottom of the screen, arrayed so as not to interfere with the item being presented. The recipient may select a particular one of the other identifiers, causing it to be presented, when that other identifier is given the focus in sequence.

ALTERNATIVE EMBODIMENTS

Although preferred embodiments are disclosed herein, many variations are possible which remain within the concept, scope, and spirit of the invention, and these variations would become clear to those skilled in the art after perusal of this application.

What is claimed is:

1. A computer readable medium containing a program which, when executed by a processor, performs a method for presenting information to a recipient, said method including:
   associating items received from said at least one information source with a determination whether said items are interesting to said recipient; and
   maintaining an active mode and an inactive mode, wherein in said active mode said foreground element presents said items to said recipient, and wherein in said inactive mode said foreground element does not present said items to said recipient; and switching between said active mode and said inactive mode in response to said determination.

2. The computer readable medium of claim 1, wherein said method includes coupling a transmitter to said at least one information source and transmitting requests for specific information.

3. The computer readable medium of claim 1, wherein said method includes coupling a transmitter to said at least one information source and transmitting requests to said at least one information source in response to said determination.

4. The computer readable medium of claim 1, wherein said method includes coupling a transmitter to said at least one information source and transmitting requests to said at least one information source in response to said items.

5. The computer readable medium of claim 1, wherein said method includes:
  interactively receiving information from a first information source and
  passively receiving information from a second information source.

6. The computer readable medium of claim 5, wherein said method includes making said determination in response to a crosslink between said first information source and said second information source.

7. The computer readable medium of claim 1, wherein said method includes:
  comparing said items with at least one recipient preference,
  and making said determination in response to an output of said comparator.

8. The computer readable medium of claim 7, wherein said method includes coupling said preference from said recipient to said background element.

9. The computer readable medium of claim 7, wherein said method includes making said at least one recipient preference responsive to a timer.

10. The computer readable medium of claim 1, wherein said method includes switching said foreground element between said active mode and said inactive mode in response to a signal indicating the presence of said recipient.

11. The computer readable medium of claim 1, wherein said method includes:
  associating an identifier in said foreground element in said active mode with each one of a plurality of said items;
  presenting said identifiers to said recipient; and
  presenting an associated item selected by said recipient from among said identifiers.

12. The computer madable medium of claim 11, wherein said method includes:
  associating a new identifier with a new item coupled from said background element;
  presenting said new identifier with said identifiers; and
  presenting said new item when said new identifier is selected by said recipient.

13. The computer readable medium of claim 11, wherein said method includes:
  associating a focus with each said identifier in a sequential order; and
  receiving a selection by said recipient of said selected item only when said selected item is associated with said focus.

14. The computer readable medium of claim 13, wherein said method includes
  associating said focus with a particular identifier and drawing attention to said particular identifier in turn in said sequence; and
  receiving said selection for a particular selected item at a time when said focus is associated with said particular selected item.

15. The computer readable medium of claim 13, wherein said method includes
  associating operation includes assigning substantially greater screen space to said particular identifier.

16. The computer readable medium of claim 13, wherein said method includes altering said sequential order in response to a signal from said background element.

17. A method as in claim 13, including moving said focus backward and forward within said sequential order in response to a signal from said recipient.

18. The computer readable medium of claim 13, wherein said method includes:
  presenting said identifiers to said recipient at a plurality of positions on a two-dimensional screen; and
  presenting of said focus in a substantially linear sweep path across said two-dimensional screen.

19. The computer readable medium of claim 1, wherein said method includes switching said foreground element between an engaging state and a nonengaging state in response to said determination, wherein said foreground element has an engaging state in which it operates to attempt to engage said recipient to select said items for presentation and wherein said foreground element has a nonengaging state in which it does not operate to attempt to engage said recipient to select said items for presentation.

20. The computer readable medium of claim 19, wherein said method includes comparing said items with at least one recipient preference, wherein said determination is made in response to a result of said comparing.

21. The computer readable medium of claim 19, wherein said method includes switching between said engaging state and said nonengaging state in response to at least one of a signal indicating presence of said recipient, a signal from said recipient and in response to a timer.

22. A computer readable medium containing a program which, when executed by a processor, performs a method for presenting information to a recipient, said method including:
  coupling a receiver to a background element;
  coupling a receiver to at least one information source;
  associating items received from said information source with a determination whether said items are interesting to said receiver,
  associating each said item with an identifier for presentation to said recipient,
  associating each said identifier with a focus in a linear sequential order,
  receiving a selection by a recipient of said selected item only when said selected item is associated with said focus; and
  presenting said item to said recipient only when selected.

23. The computer readable medium of claim 22, wherein associating said focus with a particular identifier includes assigning substantially greater screen space to said particular identifier.

24. The computer readable medium of claim 22, wherein said method includes:
  moving said focus backward or forward within said sequential order in response to a signal from said recipient.

25. The computer readable medium of claim 22, wherein said method includes:
  presenting said identifiers to said recipient of a plurality of positions on a two-dimensional screen; and associating said focus with each identifier, so that a presentation of said focus sweeps across said two-dimensional screen along a substantially linear path.

26. Apparatus, comprising:

means for associating items received from said at least one information source with a determination whether said items are interesting to said recipient; and means for maintaining an active mode and an inactive mode, wherein in said active mode said foreground element presents said items to said recipient, and wherein in said inactive mode said foreground element does not present said items to said recipient; and means for switching between said active mode and said inactive mode in response to said determination.

* * * * *